United States Patent [19]

Ludwig et al.

[11] E Re. 31,575

[45] Reissued May 1, 1984

[54] SULFUR COMPOUNDS AND METHOD OF MAKING SAME

[75] Inventors: Allen C. Ludwig; John M. Dale; Henry F. Frazier, all of San Antonio, Tex.

[73] Assignee: Southwest Research Institute, San Antonio, Tex.

[21] Appl. No.: 492,183

[22] Filed: May 6, 1983

Related U.S. Patent Documents

Reissue of:

[64] Patent No.: 4,290,816
Issued: Sep. 22, 1981
Appl. No.: 7,042
Filed: Jan. 29, 1979

[51] Int. Cl.[3] ..... C09K 3/00; C08L 101/00

[52] U.S. Cl. ..... 106/287.32; 260/139; 524/66; 528/389

[58] Field of Search ..... 106/287.32; 260/139; 528/389; 524/392, 547, 66

[56] References Cited

U.S. PATENT DOCUMENTS

| | | | |
|---|---|---|---|
| 4,147,640 | 4/1979 | Jayne et al. | 252/45 |
| 4,155,771 | 5/1979 | Cassar | 106/287.32 |
| 4,190,460 | 2/1980 | Cassar | 106/287.32 |

*Primary Examiner*—Allan Lieberman

[57] ABSTRACT

Elemental sulfur is reacted in a certain manner with at least first and second hydrocarbons to form an asphalt-like material.

18 Claims, 2 Drawing Figures

SULFUR COMPOUNDS AND METHOD OF MAKING SAME

Matter enclosed in heavy brackets [ ] appears in the original patent but forms no part of this reissue specification; matter printed in italics indicates the additions made by reissue.

The invention described herein was made in the course of, or under, a contract with the Department of Transportation.

This invention relates to sulfur compounds and a method of making same wherein elemental sulfur is reacted with certain hydrocarbons to produce a product having properties sufficiently similar to the corresponding properties of asphalt to serve as a substitute for the latter or for portland cement. In one of its aspects, it relates to coatings, road coverings, roofing material including shingles and other articles of manufacture which normally contain asphalt or portland cement as a significant constituent, but in which the composition of this invention can be used in whole, in part in lieu of the asphalt or portland cement.

Elemental sulfur has been proposed for a wide range of applications in the civil engineering and construction industry. In those applications where pure elemental sulfur is mixed with unreactive fillers, aggregates and similar products to obtain a workable product it is necessary to use from 18–30% by weight of sulfur. The composition of this invention allows one to use small quantities (4–8%) of the composition of this invention with fillers, aggregates and similar products to produce workable products.

If pure elemental sulfur is heated to 120° C., its approximate melting point, and then cooled to ambient temperature, monoclinic sulfur is intrinsically formed, followed by reversion to orthorhombic sulfur. On the other hand, when elemental sulfur is heated above 159° C., the melt consists essentially of an equilibrium mixture of $S_8$ and polymeric sulfur. On rapid cooling from the melt, "plastic sulfur" is obtained. This mixture of polymeric sulfur and "noncrystalline" $S_8$ possesses plastic properties. However, these rapidly disappear under ordinary conditions of temperature and pressure and the material becomes brittle. Efforts have been made by others to modify the sulfur with additives to reduce the embrittlement which occurs with elemental sulfur. None of those efforts have resulted in products that exhibit characteristics of asphalts as accomplished by the composition of this invention. Many additives have been proposed to modify elemental sulfur, nearly all of which fall under the heading of polymeric polysulfides or, alternatively, substances which react with elemental sulfur for the in situ formation of polymeric polysulfides. These polysulfides have been suggested as modifiers to limit or prevent the embrittlement of elemental sulfur. However, in actual practice, large amounts, in the range of 30–40%, of the polysulfides were required to produce a rubber-like material, and, for practical considerations, the cost of these modifiers generally dictated that quantities of 10% or less be used in order that the product could be at least somewhat competitive to asphalt.

Styrene monomer has also been used as a modifier for sulfur. Again, large quantities on the order of 30–50% were used and although the resultant supercooled liquids had asphalt-like properties, the product was unstable in that if overheated, or reacted for too long a time, it would continually change to become a crumbly material with a very rank odor.

One of the most recently developed modifiers for sulfur has been dicyclopentadiene. However, the use of dicyclopentadiene in any significant quantities, e.g. above 5%, causes interreaction at temperatures above 150° C. with the sulfur such that a gel occurs which is impossible to work with because the gel is irreversible in that it cannot be remelted. For this reason, most formulations employed less than 5% and the resultant product, although superior to elemental sulfur, was still hard and brittle. One advantage of this invention is that it permits the use of relatively large quantities, e.g. 10–20 weight percent of the sulfur *reaction product*, of dicyclopentadiene without forming such a gel.

IN THE DRAWINGS

In accordance with this invention, elemental sulfur is reacted in a certain manner with at least first and second hydrocarbons. The first hydrocarbon is polyunsaturated, having at least two double bonds therein with the unsaturated portion being reactable with the elemental sulfur. This particular hydrocarbon, when reacted with elemental sulfur by itself, causes a gel to form in much the same way as dicyclopentadiene reacts with sulfur to form a gel as described above. However, the sulfur is also reacted with a second hydrocarbon which has one or more unsaturated groups reactable with elemental sulfur and which prevents the aforesaid gel from forming so that the entire reaction produces a material having many properties similar to asphalt such as can be substituted therefor. This result was indeed surprising in that, as indicated above, the first hydrocarbon reacted alone with sulfur resulted in a gel material and the second hydrocarbon when reacted alone with sulfur resulted in a hard brittle mass. However, when reacted together with the sulfur, they did indeed produce the asphalt-like material.

Figure 1:
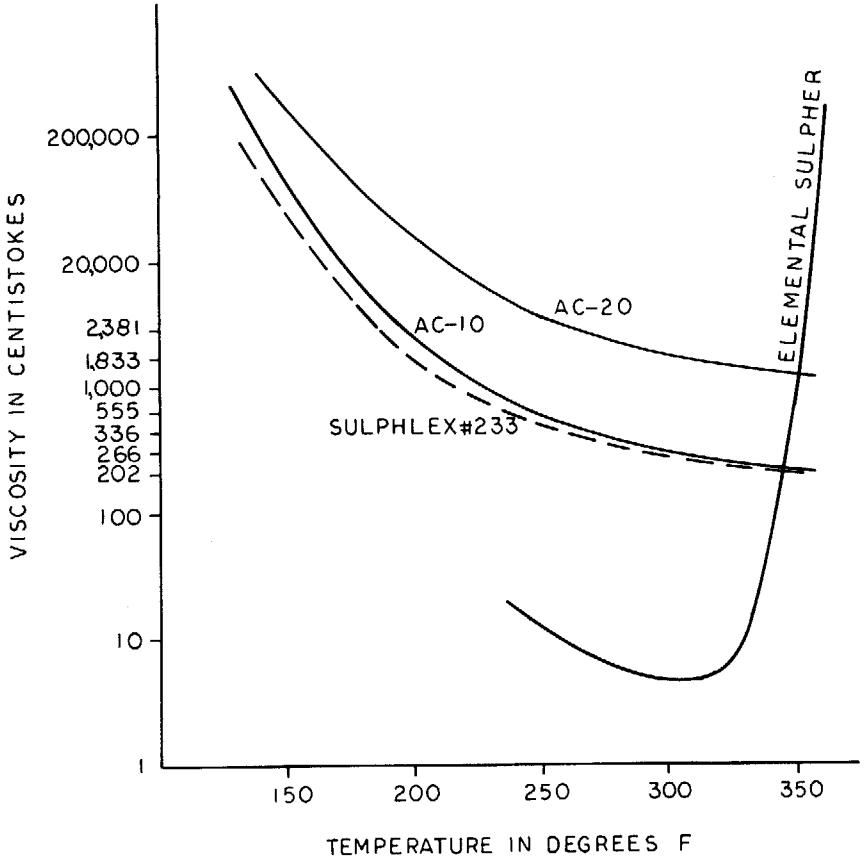
FIG. 1 is a plot of viscosity-temperature curves for several materials.

The substantial change in the properties of elemental sulfur brought about by the above-described reaction is illustrated in one of its aspects in FIG. 1. In this figure, which is a plot of viscosity against temperature, the classic sulfur viscosity curve is shown labeled "Elemental Sulfur." As has been known for many years, as the temperature of sulfur is raised above its melting point, there is a gradual decrease in viscosity until a temperature of about [318° F.] *160° C.* is reached, after which further increase in temperature causes a rapid rise in the viscosity of the molten sulfur over several orders of magnitude with very little increase in temperature. FIG. 1 also contains the viscosity curves for two well known asphalts identified as AC-10 and AC-20. The viscosity curve of a preferred modified sulfur composition of this invention, labeled "Sulphlex #233" is likewise plotted. The remarkable conformance of the Sulphlex curve to the asphalt curves when compared to the viscosity curve for elemental sulfur, demonstrates the substantial changes made in the properties of the elemental sulfur in accordance with this invention.

As indicated above, the first hydrocarbon which is coreacted with sulfur along with a second hydrocarbon is one which, when reacted with sulfur itself, forms a gel. The term "gel" as used herein means a product which at room temperature ranges from one which is brittle though rubber-like but is irreversible in that, upon reheating, it retains its solid character and does not revert to a liquid. Exemplary of these polyunsaturated hydrocarbons are the diolefins or triolefins having from 4 to 20 carbon atoms per molecule such as butadiene, hexadiene, octadiene and the like. Also included are cyclodiolefins (or cyclotriolefins) having from 4 to 20 carbon atoms per molecule such as dicyclopentadiene, which is the preferred first hydrocarbon, methylcyclopentadiene, 1,5 cyclooctadiene, 1,5,9 cyclododecatriene, myrcene, 1,7[,] cyclooctadiene and the cycloolefins having a double bond reactive with sulfur in a side [claim] *chain* such as the vinyl or allyl groups such a 4-vinyl cyclohexene-1. Also, there can be employed aryl hydrocarbons having two or more olefinic side chains such as divinyl benzene, diallyl benzene, and the like. The amount of the polyunsaturated hydrocarbon to be used should be in the range of 5 to 20 weight percent of the sulfur *reaction product*, preferably 10 to 15 weight percent. For the preferred dicyclopentadiene, it is preferred to use from 10 to 20 weight percent of the sulfur *reaction product*.

The second hydrocarbon which has one or more unsaturated groups reactable with sulfur, is one which when reacted by itself with sulfur does not produce a gel but instead produces a hard or brittle material which has physical characteristics substantially different from those of asphalt. However, when it is reacted with sulfur along with the first hydrocarbon, it prevents a gel from forming. Among such materials are the monolefins having from 2 to 20 carbon atoms per molecule such as butene, octene and the like; the cyclomonoolefins having from 4 to 20 carbon atoms per molecule such as cyclopentene, cyclooctene, alpha and beta pinene and the like; aryl hydrocarbons having an olefinic side chain such as vinyl benzene, vinyl toluene, allyl benzene, allyl toluene and the like[]; and dipentene, which is preferred. Again the amount to be employed should be in the range of 5 to 20 weight percent of the sulfur *reaction product* and preferably within the range of 10 to 15 percent. Also, the total amount of the first and second hydrocarbons should be in the range of 25 to 30 percent based on the weight of the sulfur *reaction product*.

If desired, mixtures of two or more of the first hydrocarbons can be used. Also two or more of the second hydrocarbons can be used. For example, vinyl toluene or pinene in amounts of 5 to 15 weight percent of the sulfur *reaction product* can be added along with dicyclopentadiene and dipentene to form especially preferred formulations.

If desired, the final [product] *sulfur reaction* of this invention can be blended with other materials to improve certain of its properties. For example, the color of the products of this invention ranges from cream to light tan to yellow to orange to dark brown. By adding either coal tar or petroleum asphalt, black formulations result. It has been found that coal tar helps the final product retain its flexibility and the amount employed can vary substantially but generally 5 to 25 weight percent of the total sulfurhydrocarbon reaction product is preferred. It has been found that coal tar and asphalt will mix with the products of this inventionn in all proportions. This was expected for the coal tar since elemental sulfur and coal tar readily mix to produce a one phase material. It was not expected that the asphalt would do this because elemental sulfur and asphalt do not readily mix to form one phase[,] and the solubility of sulfur in asphalt is usually limited to about 20 percent.

In accordance with the process for making the products of this invention, the elemental sulfur and the hydrocarbons can be mixed together and the reaction initiated by heating the mixture to a temperature in the range of 120° C. and sufficiently high to cause an exothermic reaction to take place. Normally, it will only be necessary to heat the mixture to a temperature of about 150° C. to 160° C., at which point the exothermic reaction begins, and further heating can be dispensed with. In some cases, it may be necessary to cool the reaction mixture in order to prevent heating to a temperature such that excessive foaming occurs, or, when the reaction is taking place in an open vessel, to prevent excessive escape of the unreacted organic compounds. Thus, it has been found that after the exothermic reaction begins, it is advisable to maintain the reaction at a temperature of about 150° C. to 175° C. Of course, when the reaction takes place in a closed vessel, the reaction temperature can be permitted to rise substantially without escape of the unreacted organic compounds. The reaction time will, of course, vary with the reaction temperature, but normally a time within the range of 1 to 8 hours is sufficient.

Alternatively, the sulfur can be heated until it is melted and the hydrocarbons added with the heating procedure thereafter being as indicated above. When this procedure is used, it is advisable to add the two hydrocarbons simultaneously or to add the first hydrocarbon after the second hydrocarbon has been added and reacted, otherwise there is a good possibility that first adding quantities greater than five percent of the first hydrocarbon will gel the formulation making it harder to introduce the second hydrocarbon and break the gel.

In some cases it may be desirable to add to the reaction mixture a minor but sufficient amount of a catalyst to accelerate the reaction. Particularly desirable catalysts are polysulfides. One particularly desirable way of providing the catalysis is simply to conduct the reaction in a vessel in which prior batches of the products of this invention have been prepared so that the residue thereof can act as the requisite catalyst.

The preferred compositions of this invention are as follows:

Sulphlex 230

70% Sulfur
15% Dicyclopentadiene
15% Dipentene

Sulphlex 233

70% Sulfur
8% Vinyl toluene
12% Dicyclopentadiene
10% Dipentene

Each of these compositions are made by heating the mixtures of chemicals to about 150° C. at which point the exothermic reaction will keep the reaction mixture hot without further external heating. In fact, external ice baths were used to prevent excessive heating of the mixture.

The compositions of this invention have a viscosity-temperature curve approximating that of asphalt as exemplified by FIG. 1. Also, they have a penetration of 5 to 100 as defined by ASTM D-5, a softening point of from 10° C. to 70° C. as defined by ASTM D-36 and a ductility of at least 100 as defined by ASTM D-113.

Some compositions of this invention when mixed with various gradiations of aggregate may be used to produce what are known as flexible pavements of the type produced with asphalt. Other compositions of this invention when mixed with various gradations of aggregate may be used to produce what are known as rigid pavements of the type produced with portland cement. Accordingly, the compositions of this invention when mixed with various gradations of aggregate may be used to produce pavements whose properties can vary from those of flexible pavements to those of rigid pavements.

Figure 2:
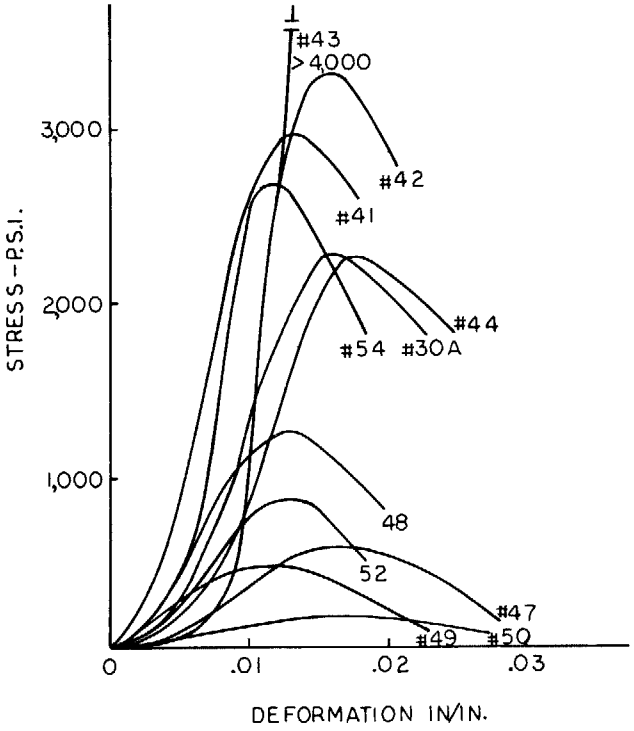
FIG. 2 is a stress-strain diagram for certain materials.

Thus referring to FIG. 2, the range of flexibility (or rigidity) of various compositions when mixed with conventional limestone aggregate (6 weight percent of the composition, remainder limestone) is shown. The compositions of the modified sulfur binders were as follows:

| | |
|---|---|
| No. 30A | 61% S; 13% VT; 13% CDC; 13% CT |
| No. 41 | 50% S; 15% VT; 15% DCPD; 20% CT |
| No. 42 | 50% S; 15% St; 15% DCPD; 20% CT |
| No. 43 | 55% S; 10% St; 15% CDC; 20% CT |
| No. 44 | 70% S; 10% VT; 10% DCPD; 10% AC-10 |
| No. 47 | 80% S; 16% St; 4% LP-3 |
| No. 48 | 80% S; 16% DP; 4% LP-3 |
| No. 49 | 77% S; 15% VT; 8% LP-3 |
| No. 50 | 77% S; 15% St; 8% LP-3 |
| No. 52 | 80% S; 16% DP; 4% LP-3 |
| No. 54 | 63% S; 6% CDC; 6% VT; 25% CT |

In the above S is sulfur; VT is vinyl toluene, DCPD is dicyclopentadiene; CDC is cyclodiene dimer concentrate (approximately 70% DCPD and 20% methyl DCPD with the balance being a mixture of hydrocarbons, largely unsaturated); St is styrene; *DP is dipentene* CT is coal tar and LP-3 is a polymer having the recurring unit $—S_4CH_2CH_2OCH_2OCH_2CH_2S_4—$.

In a field test, three different formulations in accordance with this invention were made. These were Nos. 230, 233 and 126. The composition of Nos. 230 and 233 are given above and No. 126 had the following formula:

61% Sulfur
13% CDC
13% Vinyl toluene
13% Coal tar

Batches of these formulations were made and then passed into a standard asphalt paving plant to replace the normal asphalt. Operating procedures in this plant were unchanged from those used for asphalt except that the formulations were used as such and were not diluted with a solvent or emulsified. Approximately 100 tons of limestone aggregate were mixed with each formulation, the latter being used in quantities ranging from 6–8 weight percent of the aggregate. The coated aggregate was laid on roadbeds using standard asphalt paving techniques.

The compositions of this invention can be emulsified with water in a manner very similar to asphalt. For example, one part by volume of the reaction product of 61% sulfur, 13% vinyl toluene, 13% dicyclopentadiene and 13% coal tar was mixed with one part by volume of water in the presence of caustic and oleic acid at 65° to 75° C. A high speed agitator was used to mix the ingredients which readily emulsified.

In addition to pavement applications, other uses for the composition of this invention include:

adhesives and mastics
joint sealants and caulking compounds
roofing tars and sealers
paper impregnant for pipe and roofing felts
binder for roofing shingles
emulsified coatings and sealants
protective coatings and waterproofing agents.

The principal advantage of the compositions of this invention is as a substitute for asphalt. Another advantage is their specific gravity 1.5–1.7. Unlike asphalt with a specific gravity of 1, the coatings of this invention will not be subject to being floated off of the substrate when used as coatings, underwater, particularly sea water. Another advantage is their solvent resistance to paraffinic hydrocarbons such as gasoline, diesel fuel and motor oil. A final major advantage over asphalt, particularly of the dicyclopentadiene containing formulations, is the self-extinguishing characteristics. A specimen of the formulation of 61% sulfur, 13% vinyl toluene, 13% DCPD and 13% coal tar, and a specimen of AC-10 asphalt where both ignited with a propane torch. As soon as the torch was pulled away, the sulfur formulation began to form a surface char and extinguished itself. In contrast, the asphalt continued to burn and build in intensity until it was completely consumed. This improved fire resistance would be particularly advantageous for roofing systems.

The invention having been described, what is claimed is:

1. A process for modifying elemental sulfur to produce a [material] *sulfur reaction product* having properties such that it can be used as a substitute for asphalt or portland cement comprising reacting elemental sulfur:

(1) with from 5 to 20 weight percent of the sulfur *reaction product* of a first hydrocarbon containing from 4 to 20 carbon atoms;
  (a) which is a diolefin or triolefin with the unsaturated portion being reactable with elemental sulfur; and
  (b) which by itself when reacted with elemental sulfur forms a gel; and
(2) with from 5 to 20 weight percent of the sulfur *reaction product* of a second hydrocarbon containing from 2 to 20 carbon atoms;
  (a) which is a monolefin reactable with elemental sulfur; and
  (b) which by itself when reacted with sulfur does not form a gel but forms a brittle product; and
  (c) which when the first and second hydrocarbons are so reacted with sulfur prevents said gel from forming;
(3) said reaction being initiated by heating the reactants to a temperature in the range of 120° to 200° C. and sufficiently high to cause an exothermic reaction between the reactants; and
(4) producing a *sulfur reaction* product having a viscosity curve substantially that of asphalt, a penetration of from 5 to 100, a softening point of from 10° C. to 70° C. and a ductility of at least 100.

2. The process of claim 1 wherein the first hydrocarbon is dicyclopentadiene in an amount of from 10 to 20 weight percent of the sulfur *reaction product*.

3. The process of claim 1 wherein from 5 to 15 weight percent of the sulfur *reaction product* of vinyl toluene is also reacted with the other reactants.

4. The process of claim 1 wherein from 5 to 15 weight percent of the sulfur *reaction product* of pinene is also reacted with the other reactants.

5. The process of claim 1 wherein coal tar is added in an amount of from 5 to 15 weight percent of the reacted product.

6. The process of claim 1 wherein a small but effective amount of an organic polysulfide is added to act as a catalyst.

7. A process for converting elemental sulfur into *a sulfur reaction product which is* an asphalt or portland cement substitute comprising mixing elemental sulfur with:

(1) a first hydrocarbon selected from dicyclopentadiene, methyl cyclopentadiene, divinyl benzene, cyclooctadiene, cyclododecatriene, octadiene, and myrcene, and (2) a second hydrocarbon selected from styrene, vinyl toluene, pinene and octene;

said first and second hydrocarbons each being present in an amount in the range of 5 to 20 weight percent of the sulfur *reaction product*;

heating the resulting mixture to a temperature of at least 120° C. and high enough to initiate an exothermic reaction, and recovering a *sulfur reaction* product having a viscosity curve substantially that of asphalt, a penetration of from 5 to 100, a softening point of from 10° C. to 70° C. and a ductility of at least 100.

8. The process of claim 7 wherein from 5 to 15 weight percent based on the sulfur *reaction product* of vinyl toluene is also mixed with the sulfur to react therewith.

9. The process of claim 7 wherein from 5 to 15 weight percent based on the sulfur *reaction product* of pinene is also mixed with the sulfur to react therewith.

10. The process of claim 7 wherein coal tar is added in an amount of from 5 to 15 weight percent of the reacted product.

11. The process of claim 7 wherein a small but effective amount of an organic polysulfide is added to act as a catalyst.

12. A composition having properties such that it can be used as a substitute for asphalt or portland cement comprising the *sulfur* reaction product of:

(1) elemental sulfur;

(2) from 5 to 20 weight percent of the sulfur *reaction product* of a first hydrocarbon having from 4 to 20 carbon atoms;

(a) which is a diolefin or a triolefin with the unsaturated portions being reactable with elemental sulfur; and (b) which by itself when reacted with elemental sulfur forms a gel[,]; and (3) from 5 to 20 weight percent of the sulfur [to] *reaction product of* a second hydrocarbon containing from 2 to 20 carbon atoms;

(a) which is a monolefin reactable with elemental sulfur[and];

(b) which by itself when reacted with sulfur does not form a gel but forms a brittle product; and (c) which when the first and second [organic compounds] *hydrocarbon* are so reacted with sulfur prevents said gel from forming;

said *sulfur* reaction product being formed by causing the aforesaid reactants to undergo an exothermic reaction;

said *sulfur* reaction product having a viscosity curve substantially that of asphalt, a penetration of from 5 to [15] *100*, a softening point of from 10° C. to 70° C. and a ductility of at least 100.

13. The composition of claim [10] *12* wherein the first hydrocarbon is dicyclopentadiene in an amount of 10 to 20 weight percent of the sulfur *reaction product*.

14. The composition of claim [13] *12* wherein from 5 to 15 weight percent of the sulfur *reaction product* of vinyl toluene is also reacted with the other reactants.

15. The composition of claim [13] *12* wherein from 5 to 15 weight percent of the sulfur *reaction product* of pinene is also reacted with the other reactants.

16. The composition of claim 12 wherein coal tar is present in an amount from 5 to 15 weight percent of the *sulfur* reaction product.

17. The composition of claim [10] *12* wherein a small but effective amount of an organic polysulfide is added to act as a catalyst.

18. A material for paving roads and the like comprising:

an aggregate bound together by a [material] *sulfur reaction product* made by reacting elemental sulfur:

(1) with from 5 to 20 weight percent of the sulfur *reaction product* of a first hydrocarbon containing from 4 to 20 carbon atoms;

(a) which is a diolefin or triolefin with the unsaturated portion being reactable with elemental sulfur; and (b) which by itself when reacted with elemental sulfur forms a gel; and (2) with from 5 to 20 weight percent of the sulfur *reaction product* of a second hydrocarbon containing from 2 to 20 carbon atoms;

(a) which is a monolefin reactable with elemental sulfur[and];

(b) which by itself when reacted with sulfur does not form a gel but forms a brittle product; and (c) which when the first and second hydrocarbons are so reacted with sulfur prevents said gel from forming;

(3) said reaction being initiated by heating the reactants to a temperature in the range of 120° to 200° C. and sufficiently high to cause an exothermic reaction between the reactants and (4) producing a *sulfur reaction* product having a viscosity curve substantially that of asphalt, a penetration of from 5 to 100, a softening point of from 10° C. to 70° C. and a ductility of at least 100.

* * * * *